(12) United States Patent
Dahlqvist et al.

(10) Patent No.: US 9,684,226 B2
(45) Date of Patent: Jun. 20, 2017

(54) ILLUMINATION DEVICE FOR A CAMERA (71) Applicant: AXIS AB, Lund (SE)

(72) Inventors: Christian Dahlqvist, Löberöd (SE); Jonas Hellström, Bromma (SE)

(73) Assignee: AXIS AB, Lund (SE)

( * ) Notice: Subject to any disclaimer, the term of this patent is extended or adjusted under 35 U.S.C. 154(b) by 102 days.

(21) Appl. No.: 14/518,210

(22) Filed: Oct. 20, 2014

(65) Prior Publication Data

US 2015/0153632 A1    Jun. 4, 2015

(30) Foreign Application Priority Data

Dec. 3, 2013 (EP) .................................... 13195508

(51) Int. Cl.
*G03B 15/05* (2006.01)
*H04N 5/225* (2006.01)
*G03B 15/03* (2006.01)

(52) U.S. Cl.
CPC ............. *G03B 15/05* (2013.01); *G03B 15/03* (2013.01); *H04N 5/2251* (2013.01); *H04N 5/2256* (2013.01); *G03B 2215/0567* (2013.01); *G03B 2215/0585* (2013.01)

(58) Field of Classification Search
None
See application file for complete search history.

(56) References Cited

U.S. PATENT DOCUMENTS

| 4,078,240 A | * | 3/1978 | Kaneko ................. G03B 15/05 315/241 P |
| 4,104,707 A | | 8/1978 | Schneider |
| 4,233,648 A | * | 11/1980 | Geissler ................ G03B 15/05 362/17 |
| 6,327,434 B1 | | 12/2001 | Okumura et al. |
| 2002/0063501 A1 | | 5/2002 | Tenmyo |
| 2005/0062937 A1 | | 3/2005 | Imade et al. |
| 2008/0158879 A1 | | 7/2008 | Sun et al. |
| 2010/0103676 A1 | | 4/2010 | Noeth |
| 2010/0246186 A1 | | 9/2010 | Chang et al. |
| 2013/0038736 A1 | | 2/2013 | Yamamura |
| 2014/0022809 A1 | | 1/2014 | Hager |

FOREIGN PATENT DOCUMENTS

| DE | 3113620 A1 | 2/1983 |
| DE | 102011006699 A1 | 10/2012 |
| EP | 2490439 A1 | 8/2012 |
| JP | H0961896 A | 3/1997 |
| JP | 2007234479 A | 9/2007 |

* cited by examiner

*Primary Examiner* — Sharon Payne
(74) *Attorney, Agent, or Firm* — Volpe and Koenig, P.C.

(57) ABSTRACT

An illumination device for illuminating a camera's field of view, including a light source, and a reflector unit having reflecting sections is provided. Each reflecting section is associated with a light distribution, wherein the light distributions for different reflecting sections are different. The reflector unit is arranged such that light emitted by the light source is deflected by one of said reflecting sections being selected based on the camera's field of view. A method for illuminating a camera's field of view is also provided.

15 Claims, 5 Drawing Sheets

ILLUMINATION DEVICE FOR A CAMERA

CROSS REFERENCE TO RELATED APPLICATION(S)

This application claims the benefit of European Patent Application No 13195508.0 filed on Dec. 3, 2013, which is incorporated by reference as if fully set forth.

FIELD OF INVENTION

The invention relates to an illumination device for illuminating a camera's field of view, and to a method for illuminating a camera's field of view.

BACKGROUND

Surveillance cameras used to monitor a specific setting may from time to time need additional lighting to be able to give a good picture of the environment they monitor. This is for instance the case during night time in an outdoor setting when the natural light is insufficient for the camera. Some type of lighting can then be used in combination with the surveillance camera. A common choice of light sources is light emitting diodes (LEDs) emitting infrared or white light, for illuminating the scene which is monitored by the surveillance camera.

A problem when using a light source in the camera is that it tends to generate a lot of waste heat, which in turn may have a negative impact on the performance of an image sensor in the camera, especially if the light source is integrated in the camera.

Another issue is that the illumination provided by a camera integrated light source or an external light source is often not reconfigurable or adaptable when the installation has been finished without physically replacing the light source. Instead, prior to the actual installation of the surveillance camera, a proper range of the illumination to match the imaging conditions in the installations needs to be determined in advance, and this can be a cumbersome task requiring a lot of effort in some cases. This is often what is done when installing a fixed focus camera, having fixed imaging settings of the optics during operation.

However, in a varifocal camera, it is not feasible to the same extent to choose a setting for the lighting in advance, as these cameras alter the zoom and focus position dynamically during operation. A light source that has a long and wide range, in order to cover all possible distances of interest for the particular camera during operation, is often chosen for varifocal cameras. However, this results in high power consumption as well as more heat generation than necessary for most of the operation time.

The problems with the excessive heat generation and power consumption may be reduced if lighting can be controlled to match the camera's need of light.

EP 2 490 439 discloses an illumination device for illuminating a scene monitored by a camera. The device has a plurality of LEDs associated with a plurality of lenses. Depending on area to be illuminated, the suitable LED and lens configuration is selected.

SUMMARY

Described herein is an illumination device and method that alleviates the above problems regarding heat generation and power consumption, and to provide an illumination device and method where the light provided by the illumination device may be efficiently controlled to match the need for illumination of the camera and specific use case.

According to a first aspect, the above and further objects that will be evident from the following description are achieved by an illumination device for illuminating a camera's field of view, the illumination device comprising a light source, and a reflector unit having reflecting sections. Each reflecting section being associated with a light distribution, wherein the light distributions for different reflecting sections are different. The reflector unit being arranged such that light emitted by the light source is deflected by one of the reflecting sections being selected based on the camera's field of view.

The illumination device and method provides a tailor made light distribution based on the camera's field of view. As such, each of the reflecting sections is associated with a specific light distribution. By that different light distributions may be selected, the illumination device according to an embodiment can provide suitable illumination for a variety of field of views. The reflecting section providing the most suitable light distribution can be selected by arranging the reflector unit such that the light emitted by the light source is deflected by the selected reflecting section.

The illumination device can thus be used to, in a simple and efficient way, select a proper illumination distribution during installation and configuration of the camera.

Besides providing illumination in a simple and efficient way, the illumination device is also less costly when compared to known solutions using lenses. Lenses for use in camera illumination applications need to be small and is thus quite expensive to produce in relation to the cost of producing reflectors.

Different combinations of light source configuration and reflecting section design are feasible to achieve different light distributions.

In an embodiment, each of the reflecting sections may form a single reflecting surface. Further, the light source may comprise a plurality of lighting elements arranged in a cluster. This embodiment is space efficient in that the reflecting section may be made small and the cluster configuration requires a limited amount of area. The light distribution of this reflecting section may be suitable for use with a fixed focus camera monitoring a large non-focused field of view.

In another embodiment, each of the reflecting sections may form a plurality of reflecting surfaces. Further, the light source may comprise a plurality of lighting elements arranged in a row, such that each lighting element is associated with a reflecting surface. By this embodiment, an oval light distribution may be formed which can be suitable for wide field of views becoming increasingly common for surveillance cameras.

The reflecting surfaces, for example, may be formed of planar or concavely shaped surfaces of a reflecting material, such as polished metal surface or a surface of glass or plastic provided with a metal layer. The reflecting surfaces may be integrated in a body of the reflector unit. The body may be made of plastic, metal or any other suitable material, for example.

In another embodiment, the reflector unit may be adjustably arranged. Thus, the illumination device may be used to dynamically match the illumination to the imaging conditions and the field of view during operation.

In another embodiment, the reflector unit may be adjustable in a stepwise manner. By using a stepwise arrangement, where the position of the selected reflecting surface is fixed in view of the light source, the light distribution associated with each reflecting surface may be better defined.

In another embodiment, the illumination device may form part of a camera. The illumination device may be arranged such that the reflector unit is located between the light source of the illumination device and an image sensor of the camera. Thus, the light unit is spaced from the image sensor. This is advantageous in that the image sensor is not, or at least less prone to be, affected by the waste heat produced by the light source, and in that there is more space around the light unit for dissipating the waste heat.

In another embodiment, the reflector unit may be located between the light source of the illumination device and the image sensor as seen in a direction orthogonal to a viewing direction of the camera.

In another embodiment, the illumination device may be included in an illumination module being removably mounted on an image sensor module comprising the image sensor. This is advantageous in that the illumination module may be added, as e.g. an accessory, to the image sensor module after the image sensor module has been installed. The illumination module may further be easily replaced without the need for replacing the whole camera.

In another embodiment, a camera may further comprise a drive unit for adjustment of the reflector unit being adjustably arranged. The drive unit may be located in the image sensor module or in the illumination module. The drive unit may be common for the image sensor module and the illumination device.

According to a second aspect, the above and further objects are achieved by a method for illuminating a camera's field of view, the method comprising: providing a light source; providing a reflector unit having reflecting sections, each reflecting section being associated with a light distribution, wherein the light distributions for different reflecting sections are different; selecting one of the reflecting sections based on the camera's field of view; and arranging the reflector unit such that the selected reflecting section deflects light emitted by the light source.

In an embodiment, the reflector unit may be adjustably arranged. Thus, the method may comprise a further step of rearranging the reflector unit such that the reselected reflecting section deflects light emitted by the light source.

In an embodiment, a reflection section may be selected based on a number of different parameters. As an example, the reflection section providing the best illumination efficiency may be selected in order to minimize unnecessary and potentially disturbing light outside the field of view.

The above features and advantages disclosed in connection to the first aspect apply also to this second aspect. To avoid undue repletion, reference is made to the above.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above disclosed and other aspects of the present invention will now be described in more detail, with reference to the appended drawings showing embodiments of the invention.

Note that figures are not to scale for purposes of clarity.

DETAILED DESCRIPTION OF THE PREFERRED EMBODIMENTS

The present invention will now be described more fully with reference to the accompanying drawings, in which currently preferred embodiments of the invention are shown. The invention may however be embodied in many different forms and should not be construed as limited to the embodiments set forth herein.

Figure 1:
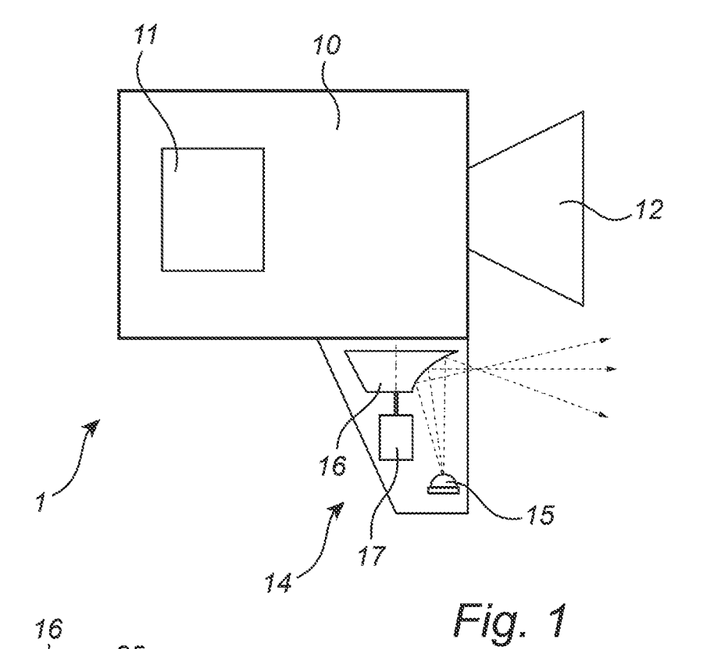
FIG. 1 illustrates a camera comprising an illumination device according to an embodiment of the present invention.

A camera 1 comprising an image sensor module 10 and an illumination device 14 is illustrated in FIG. 1. The image sensor module 10 comprises an image sensor 11 and an imaging lens 12. The camera 1 can be a fixed focus surveillance camera, or a varifocal surveillance camera, which is able to adapt its focus to objects at varying distances from the camera 1. In the case of a varifocal camera, this may or may not have zooming capabilities, and the zoom may be either manually or electrically controlled. The camera 1 may further be either fixed or movable in a pan/tilt fashion.

The illumination device 14 comprises a reflector unit 16, a light source 15 and a drive unit 17. The illumination device 14 may form an illumination module which is externally mounted on the image sensor module 10. The illumination module may be permanently or removably mounted on the image sensor module 10. Alternatively, the illumination device 14 may be integrated in the image sensor module 10.

The light source 15 may comprise one or more light units such as LED units. For purposes of clarity, only one light unit is illustrated in the FIGS. 1-5. Different types of LEDs or other light emitting sources may be used in the illumination device 14. A common choice, e.g. to be used together with a camera 1 used during night time and adapted for infrared photography, would be LEDs emitting light in the infrared or more specifically the near-infrared (~850 nm) spectrum, but white light LEDs may also be used.

Figure 2:
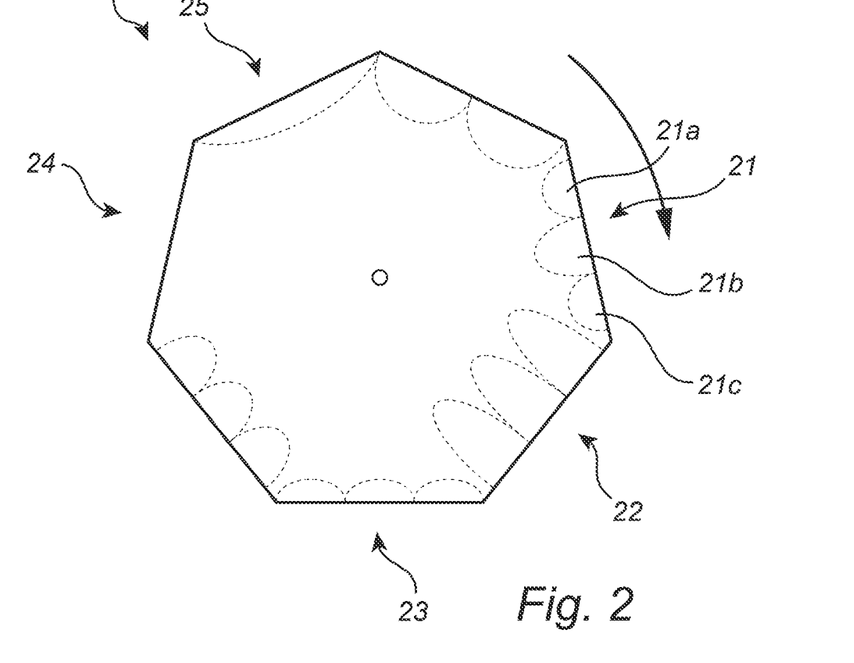
FIG. 2 is a view from above of a reflector unit according to an embodiment of the invention.

FIG. 2 is a view from above of the reflector unit 16. The reflector unit 16 has a plurality of reflecting sections 21, 22, 23, 24, 25. Each of the reflecting sections comprises one or more reflecting surfaces. As an example, the reflecting section 21 comprises three reflecting surfaces 21a, 21b, 21c. The reflecting surfaces are formed of planar or concavely shaped surfaces of a reflecting material, such as polished metal surface or a glass or plastic surface provided with a metal layer. Different designs of the reflecting surfaces will be discussed in connection to FIGS. 3-5. The reflecting surfaces may be integrated in a body of the reflector unit 16. The body may be made of plastic, metal or any other suitable material.

The reflector unit 16 is arranged in the illumination device 14 such that the light emitted by the light source 15 is deflected by one of the reflection sections of the reflector unit 16.

One of the incentives leading up to the invention is the desire to provide a tailor made light distribution based on the camera's 1 field of view. Depending on the type and configuration of the camera 1, the field of view is different. By field of view is meant the area of interest for the camera 1 to monitor. For example, the camera 1 may be configured to focus and zoom to monitor a distant object or a nearby object. Different light distributions are required in order to optimally illuminate these configurations. As a further example, the camera 1 may be configured to view a large area instead of a particular object. In that case, yet another light distribution would be needed. Some cameras are arranged with a fixed zoom, or non-zoom, and other cameras can vary its zoom and focus.

For this purpose, each of the reflecting sections 21, 22, 23, 24, 25 is associated with a light distribution. By light distribution is meant the appearance of the light beam, formed by light emitted by the light source 15 and deflected by a reflecting section, in the far field of the reflecting section. By far field of the light beam is meant the light beam at any distance from the reflecting section at which the normalized light distribution of the beam cross-section is the same as for infinite distance. In other words, the far field can be described as representing any distance from the reflecting section being much larger than all local dimensions of the reflecting section itself. The light distribution of the light beam does not change in the far field other than in that the area of the cross-section increases linearly for a given divergence angle, i.e. light beam angle. Non-limiting examples of parameters describing the appearance of the light beam are light beam angle (divergence angle), cross-sectional area of the light beam at a certain distance, cross-sectional shape of the light beam, and intensity distribution within the cross-sectional area of the light beam.

By that different light distributions may be selected, the illumination device 14 according to the invention can provide suitable illumination for a variety of field of views. The reflecting section providing the most suitable light distribution can be selected by arranging the reflector unit 16 such that the light emitted by the light source 15 is deflected by the selected reflecting section.

The illumination device 14 can thus be used to, in a simple and efficient way, select a proper illumination distribution during installation and configuration of the camera 1. The illumination device 14 may further be used to dynamically match the illumination to the imaging conditions and the field of view during operation. To this end, the reflector unit 16 may be adjustably arranged. In other words, the reflector unit 16 can be rearranged so as to change the reflecting section being positioned to deflect light emitted by the light source 15. In this embodiment, the drive unit 17, comprising e.g. a conventional stepping motor, is connected to the reflector unit 16 for adjustment of the reflector unit 14. As indicated in FIG. 2, the reflector unit 16 may be rotated in order to switch from one selected reflecting surface to another. The drive unit 17 performs this rotation. Alternatively, the reflector unit 16 may be adjusted by a drive unit being common for the image sensor module 10 and the illumination device 14.

The adjustment of the reflector unit 16 may be performed in a stepwise manner, meaning that a selected reflecting section is positioned such that the provided light beam comes from this reflecting section only. The reflector unit 16 can thus not be positioned such that the light beam comes from two adjacent reflecting sections. By using a stepwise arrangement, where the position of the selected reflecting section is fixed in view of the light source 15, the light distribution associated with each reflecting section may be better defined.

Thus, it is also feasible to change the illumination setting of a camera 1 once in place, without any need to replace illumination device 14. For example, the illumination range, or the (expected) distance to an object, can be set by a user in a user interface, e.g. a user interface of a fixed focus camera. Another option is to use advanced image processing to calculate the distance to the focal plane, and from that the optimal lighting settings, and then control the illumination device 14 accordingly. The camera 1 may comprise a processor which is connected to a drive unit for controlling the adjustment of the reflector unit 16.

In one embodiment, the intensity of the light source 15 may be varied depending on the camera's field of view and/or on the selected reflecting section. As an example, the zoom value of an electrically zoomable camera's imaging lens can be used as an input parameter to control the input power to the light source 15. As another example, the zoom value may in a first step be used to select the suitable reflecting section and the reflector unit 16 may be arranged accordingly. In a second step the distance to the focal plane may be used to control the input power to the light source 15 and in this way define the intensity of the illumination.

Besides providing illumination in a simple and efficient way, the inventive illumination device 14 is also less costly when compared to known solutions using lenses. Lenses for use in camera illumination applications need to be small and is thus quite expensive to produce in relation to the cost of producing reflectors.

Another advantage is achieved by the embodiment illustrated in FIG. 1. Here, the illumination device 14 is arranged such that the reflector unit 16 is located between the light source 15 and the image sensor 11. Thus, the light unit 15 is distanced from the image sensor 11. This is advantageous in that the image sensor 11 is not affected by the waste heat produced by the light source 15, and in that there is more space around the light unit 15 for dissipating the waste heat. Thus, both the image sensor 11 and the light unit 15 may be kept cooler, thus increasing their respective performance. In some embodiment, it may be preferred to arrange the illumination device 14 on the side or at the top of the image sensor module 10, thus minimizing the heating effect of the illumination device 14 on the image sensor module 10.

A particular advantage is achieved in the embodiment of FIG. 1 since the reflector unit 16 and the light source 15 of the illumination device 14 are arranged along an axis being essentially orthogonal to the viewing direction.

Returning to FIG. 2, the light distributions associated with each of the reflecting sections 21, 22, 23, 24, 25 depends on the design of the reflecting surfaces of the reflecting sections in combination with the configuration of the one or more light units of the light source 15. The reflecting sections may comprise a single reflecting surface 22 or a plurality of reflecting surfaces 21a, 21b, 21c. The design of the reflecting surfaces of a reflecting section will now be exemplified with reference to FIGS. 3-5.

Figure 3:
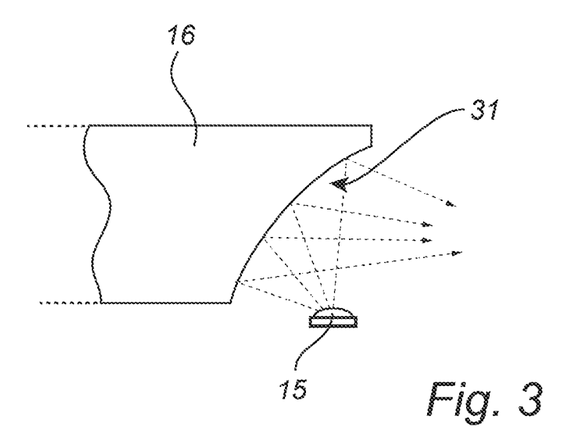
FIGS. 3-5 illustrate examples of reflecting surfaces.

In FIG. 3, a concavely shaped reflecting surface 31 is illustrated. The light emitted by the light source 15 is deflected by the reflecting surface 31 and forms a light beam with a particular light distribution in the far field of the reflecting surface 31.

Figure 4:
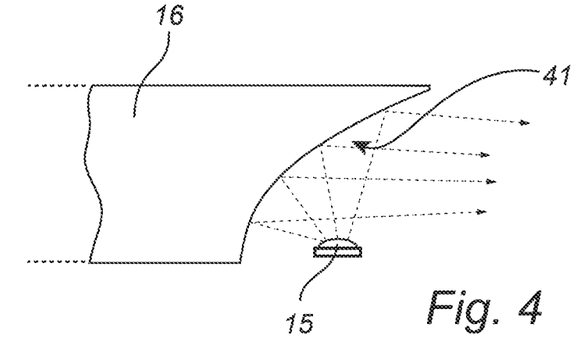

The reflecting surface 41 in FIG. 4 has a deeper curve, and provides a narrower light beam, i.e. a light beam having a smaller beam angle. Moreover, the reflecting surface 41 extends farther from the light source 15 in the outward direction of the reflector unit 16 when compared to the reflecting surface 31 of FIG. 3.

Figure 5:
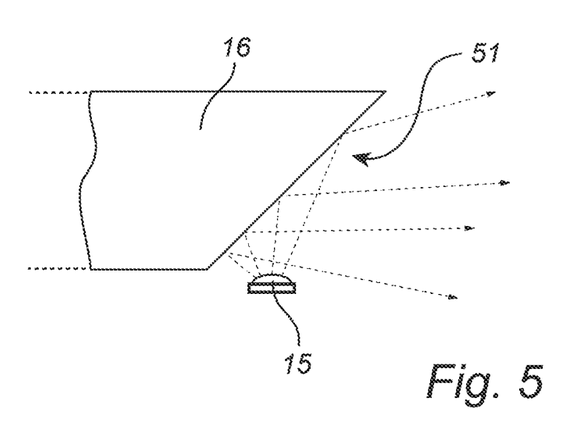

The reflecting surface 51 of FIG. 5 is on the other hand planar, and provides a wide light beam suitable for illuminating a large field of view.

As can be seen by these examples, different reflecting surfaces provide different light beam angles, i.e. how much the light diverges. A reflecting surface deflecting light into parallel light beams provides the narrowest light beam which essentially does not diverge at all.

It is noted that the light beams illustrated in FIGS. 3-5 represent the near field area of the light beams. In the far field of the light beams, they form a defined light distribution, as will be disclosed in connection to FIGS. 6-9.

It should be noted that the design of the reflecting surfaces are sometimes complex and may not easily be described in straightforward terms such as a single focal length. The reflecting surface is normally designed by first simulating the resulting light distribution of the reflecting surface with a fixed light source configuration, and then adjusting the design of the reflecting surface until the desired light distribution is achieved. Thereafter the shape of the reflecting surface may be implemented in a physical design.

It is noted that different reflecting surfaces within the same reflecting section may have different designs.

Examples of different light distributions provided by different selected reflecting surfaces will now be described with reference to FIGS. 6-8. By different light distributions is meant that the light beam, formed by light emitted by the light source and deflected by a reflecting section, is different in view of parameters such as light beam angle (divergence) and different cross-sections of the light beam. The cross-sections may in turn also vary on different parameters such as shape and intensity distribution within the cross-sectional area. Different parameters of the light beam will be exemplified in the following.

Figure 6:
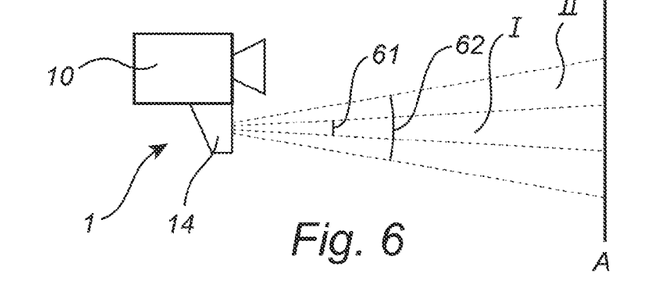
FIG. 6 illustrates different light distributions generated by different reflecting sections of an illumination device according to an embodiment of the invention.

Two examples of light beams I and II provided from different reflecting sections are illustrated in FIG. 6. The first light beam I is narrower than the second light beam II, i.e. the beam angle 61 of the first light beam I is smaller than the beam angle 62 of the second light beam II. The first light beam I could be used to illuminate a narrow field of view, for example focusing on an object. The second light beam II could be used to illuminate a larger field of view, or an object which is closer to the camera 1, thus requiring a larger beam angle 62 in order to illuminate the whole object.

It is noted that the exemplified light beams are not provided simultaneously.

Figure 7:
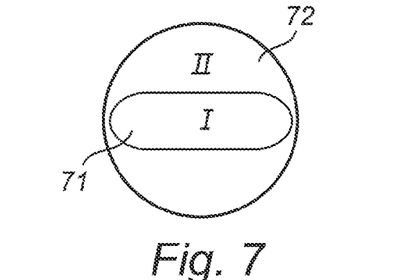
FIGS. 7-9 are cross-sectional views of the light distributions along A of FIG. 6.

The cross-sections of the first light beam I and the second light beam II as seen along A are illustrated in FIG. 7. As can be seen, the cross-sections 71, 72 differ in both size and shape. The size depends on the beam angles 61, 62. The shape depends on the configuration of the reflecting section in combination with the positioning of the light source 15. Depending on the shape and size of the field of view of the camera 1, the most suitable reflecting section and thus light distribution may be selected.

Figure 8:
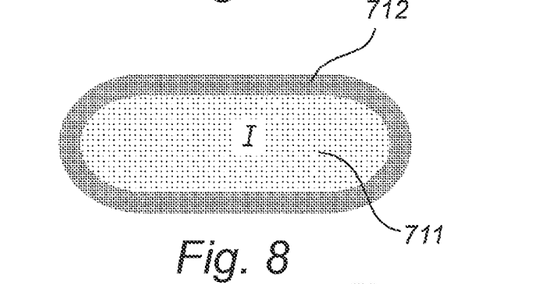

The light distribution may also vary in intensity distribution, as illustrated in FIG. 8. Here, the cross-section 71 of the first light beam I is illustrated. The selected reflecting section providing this light distribution is arranged to deflect the light emitted by the light source 15 non-uniformly. The outer area 712 is in this example darker than the inner area 711. This light distribution may be desirable when the field of view is slightly larger than an object to be monitored.

Reflecting sections providing other light distributions are also feasible. For example, the reflecting section may be designed so that the deflected light from the light source 15 illuminates only parts of the periphery of the field of view of the camera 1, i.e. the one or more reflecting surfaces of the reflecting section are designed to provide a frame shaped light distribution.

Figure 9:
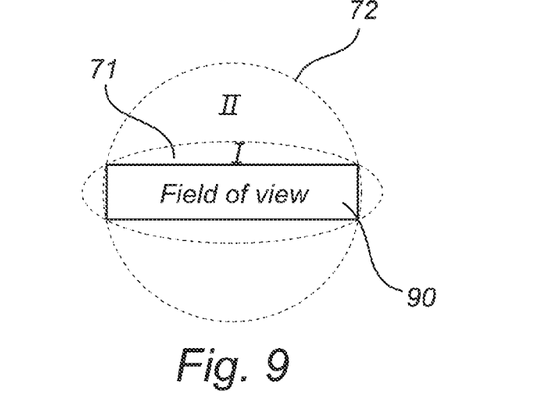

FIG. 9 illustrates an example of one of the advantages with the invention, which is optimization of the illumination efficiency. Throughout this application, illumination efficiency is defined as the ratio between the light illuminating the field of view 90 and the total light provided by the light source 15. In this example, there are two reflecting sections to choose from: one that provides the first light beam cross-section 71 and one that provides the second light beam cross-section 72. Either one of the cross-sections illuminates the field of view and is thus satisfying in this aspect. However, the second cross-section 72 provides, to a large extent, light to an area outside the field of view 90, which is not of interest. This waste light is wasting energy and could even be perceived disturbing in the environment which is illuminated. The reflecting section being associated with first light beam cross-section 71, providing only a small amount of light outside the field of view 90, thus provides a higher illumination efficiency and can with advantage be selected for this application.

Figure 10A:
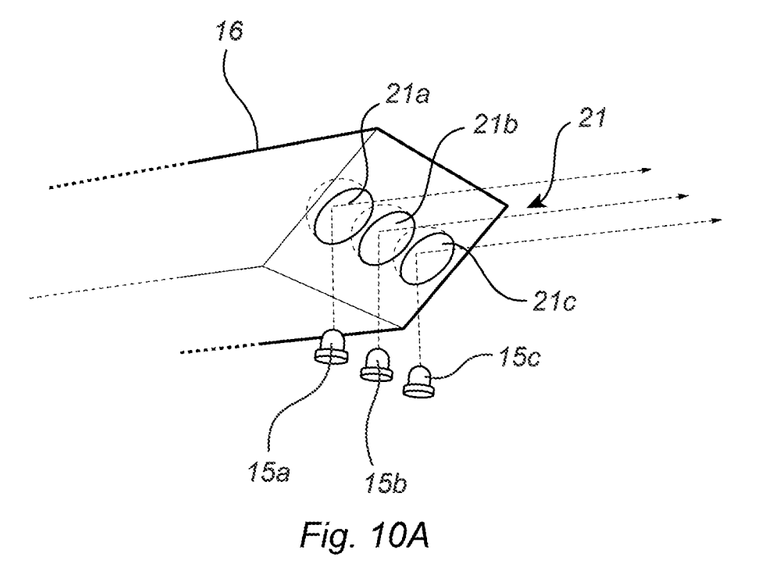
FIGS. 10A and 10B illustrate different combinations of light source configurations and reflecting sections.

A simple way to provide a light distribution being elongated essentially in the horizontal direction is illustrated in FIG. 10A, showing the reflecting surface 21 of FIG. 2. In this example, the light source 15 comprises three light source units 15a, 15b, 15b, which are for examples LED units. The light source units 15a, 15b, 15c are arranged in a row. Each light source unit 15a, 15b, 15c is associated with the reflecting surfaces 21a, 21b, 21c of the reflecting section 21. By associated is meant that the light source unit 15a is arranged such that the light emitted by it is essentially deflected by the reflecting surface 21a, and correspondingly for the other light source units 15b, 15c. By this configuration of multiple light source units and reflecting surfaces, an elongated light distribution with less complex reflector surface designs than by a single reflector surface may be achieved.

Figure 10B:
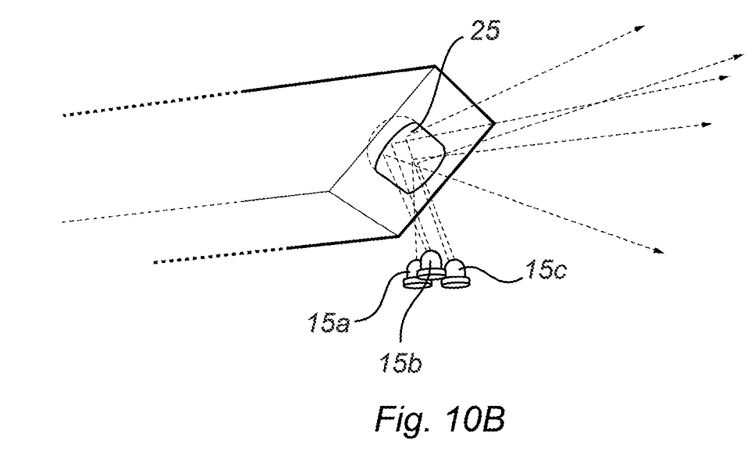

Another configuration of the light source units 15a, 15b, 15c is illustrated in FIG. 10B, showing the reflecting surface 25 of FIG. 2. Here, the light source units 15a, 15b, 15c are arranged in a cluster. The reflecting unit 25 is provided with a single reflecting surface. This solution is more space efficient in that the reflecting section may be made small and the cluster configuration requires less space. This type of configuration may be suitable when the reflector unit needs to be small in order to achieve a compact illumination device.

A reflecting unit may comprise reflecting sections having only single reflecting surfaces or only pluralities of reflecting surfaces, or a combination of both. The light source 15 may comprise a plurality of sets of light units, each set being arranged according to a predetermined pattern. Each pattern may be associated with a reflecting section, and when the most appropriate reflecting section has been selected, the light units of the associated pattern are activated. Thus, the light source configuration may be optimized for each selectable reflecting section.

In another possible embodiment, one reflecting section may be associated with two or more light source patterns. Thus, the reflecting section is associated with two different light distributions depending on which light source pattern is activated. Depending on the desired light distribution, the light units of the suitable light source pattern is activated.

It is appreciated that the skilled person realizes how to configure the camera 1 with suitable and known processors, electrical connections, controllers etc. in order to achieve the above disclosed features and advantages.

Figure 11:
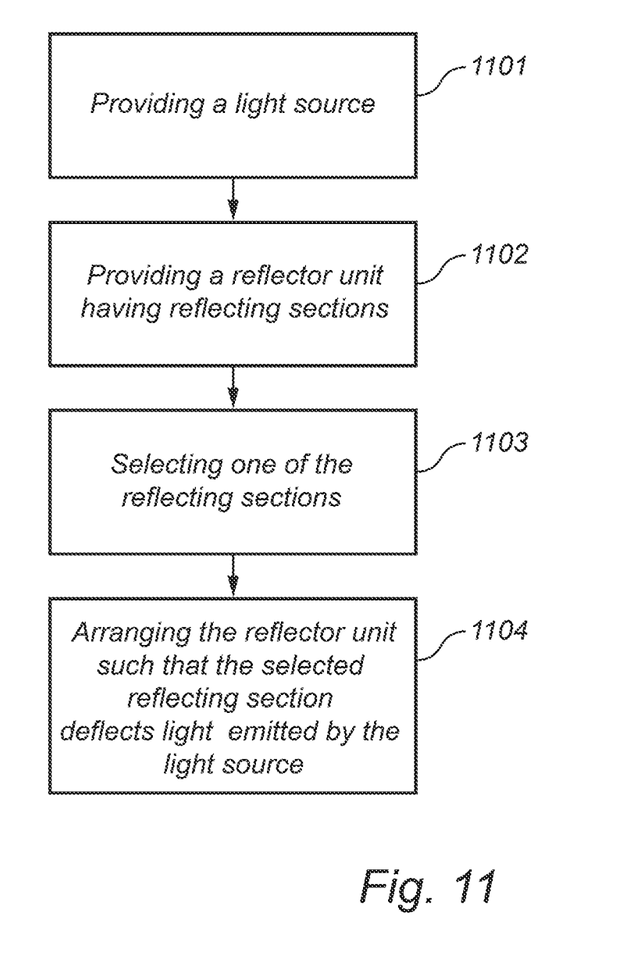
FIG. 11 shows a flowchart of a method of illuminating a camera's field of view.

A method for illuminating a camera's field of view is illustrated as a flow chart in FIG. 11. The method comprises the steps of providing 1101 a light source, providing 1102 a reflector unit having reflecting sections, selecting 1103 one of the reflecting sections and arranging the reflector unit 1104 such that the selected reflecting section deflects light emitted by the light source.

Each reflecting section is associated with a light distribution, as previously disclosed. The reflecting section is selected based on the desired light distribution for the camera's field of view.

The arrangement may be made permanent, or be made adjustably so that the reflector unit is rearrangable. Thus, another reflecting section may be selected during operation of the camera 1, and the reflector unit may be rearranged according to the new selection.

As previously disclosed, a reflection section may be selected based on a number of different parameters. As an example, the reflection section providing the best illumination efficiency may be selected in order to minimize unnecessary and potentially disturbing light outside the field of view.

Other features of the steps have been disclosed in connection to the previous figures and apply also to the method, where applicable.

The person skilled in the art realizes that the present invention by no means is limited to the preferred embodiments described above. On the contrary, many modifications and variations are possible within the scope of the appended claims. For example, the reflector unit may be arranged permanently in the illumination device, e.g. by means of glue. In some applications it might be sufficient that a reflecting section is selected once at the installation and thereafter is fixed. Further, the adjustment of the reflector unit may be performed manually instead of by a drive unit. This may be practical during installation of the illumination device. Of course both manual and automatic adjustment of the reflector unit may be feasible.

What is claimed is:

1. An illumination device for illuminating a camera's field of view, comprising:
   a light source, and
   a reflector unit having reflecting sections, each reflecting section being associated with a light distribution, wherein the light distributions for different reflecting sections are different and wherein the different light distributions have different cross-sectional illumination patterns,
   the reflector unit being arranged such that light emitted by the light source is deflected into the camera's field of view by only one of said reflecting sections being selected based on the camera's field of view, wherein each reflecting section reflects a different one of the light distributions towards substantially the same area in the camera's field of view.

2. The illumination device according to claim 1, wherein the reflecting sections each forms a single reflecting surface, and wherein the light source comprises a plurality of lighting elements arranged in a cluster.

3. The illumination device according to claim 1, wherein the reflecting sections each forms a plurality of reflecting surfaces, and wherein the light source comprises a plurality of lighting elements arranged in a row, such that each lighting element is associated with a reflecting surface.

4. The illumination device according to claim 1, wherein the reflecting sections are planar or concavely shaped.

5. The illumination device according to any of claim 1, wherein the reflector unit is adjustably arranged.

6. The illumination device according to claim 5, wherein the reflector unit is adjustable in a stepwise manner.

7. The illumination device according to claim 1, wherein the reflector unit is arranged such that said deflection of light emitted by the light source is essentially orthogonal.

8. A camera, comprising:
   an illumination device, wherein the illumination device comprises:
   a light source, and
   a reflector unit having reflecting sections, each reflecting section being associated with a light distribution, wherein the light distributions for different reflecting sections are different and wherein the different light distributions have different cross-sectional illumination patterns,
   the reflector unit being arranged such that light emitted by the light source is directly deflected by only one of said reflecting sections being selected based on the camera's field of view, wherein each reflecting section reflects a different one of the light distributions towards substantially the same area in the camera's field of view.

9. The camera according to claim 8, wherein the camera comprises an image sensor and wherein the illumination device is arranged such that the reflector unit is located between the light source and the image sensor as seen in a direction orthogonal to a viewing direction of said camera.

10. The camera according to claim 9, wherein the reflector unit and the light source of the illumination device are arranged along an axis being essentially orthogonal to the viewing direction.

11. The camera according to claim 8, wherein the illumination device is included in an illumination module being removably mounted on an image sensor module comprising an image sensor.

12. The camera according to claim 8, wherein the reflector unit is adjustably arranged, and wherein the camera further comprises a drive unit for adjustment of the reflector unit.

13. A method for illuminating a camera's field of view, the method comprising:
   providing a light source,
   providing a reflector unit having reflecting sections, each reflecting section being associated with a light distribution, wherein the light distributions for different reflecting sections are different and wherein the different light distributions have different cross-sectional illumination patterns,
   selecting only one of said reflecting sections based on the camera's field of view, wherein the camera's field of view is an area of interest, and
   arranging said reflector unit such that the selected reflecting section deflects light emitted by the light source into the camera's field of view, wherein each reflecting section reflects a different one of the light distributions towards substantially the same area in the camera's field of view.

14. The method according to claim 13, wherein the reflector unit is adjustably arranged.

15. The method according to claim 13, wherein the reflection section providing the best illumination efficiency is selected.

* * * * *